US010065347B2

(12) United States Patent
Smith

(10) Patent No.: US 10,065,347 B2
(45) Date of Patent: Sep. 4, 2018

(54) METHODS OF MANUFACTURING A PATTERN RECOGNITION FEATURE ON A MOLDED LEAD FRAME

(71) Applicants: Illinois Tool works, Inc., Glenview, IL (US); Mary Miyamoto-Smith, Frankfort, IL (US)

(72) Inventor: Ronald M. Smith, Manhattan, IL (US)

(73) Assignee: Illinois Tool Works Inc., Glenview, IL (US)

( * ) Notice: Subject to any disclaimer, the term of this patent is extended or adjusted under 35 U.S.C. 154(b) by 551 days.

(21) Appl. No.: 14/714,741

(22) Filed: May 18, 2015

(65) Prior Publication Data

US 2015/0251344 A1    Sep. 10, 2015

Related U.S. Application Data

(62) Division of application No. 13/599,250, filed on Aug. 30, 2012, now abandoned.

(60) Provisional application No. 61/551,747, filed on Oct. 26, 2011.

(51) Int. Cl.
*H01R 43/00* (2006.01)
*B29C 45/14* (2006.01)
*H01R 43/24* (2006.01)
*B29L 31/36* (2006.01)
*B29L 31/34* (2006.01)

(52) U.S. Cl.
CPC .. *B29C 45/14065* (2013.01); *B29C 45/14655* (2013.01); *B29C 2045/14147* (2013.01); *B29L 2031/3493* (2013.01); *B29L 2031/36* (2013.01); *H01R 43/24* (2013.01); *Y10T 29/4998* (2015.01); *Y10T 428/24298* (2015.01); *Y10T 428/24331* (2015.01)

(58) Field of Classification Search
CPC ........ B29C 45/14065; B29C 45/14655; B29C 2045/14147; H01L 21/565; G02B 9/12; B29L 2031/3493; B29L 2031/36; Y10T 29/49121; Y10T 29/49131; Y10T 29/4998; Y10T 428/24298; Y10T 428/24331; H01R 43/24
USPC ............ 29/827, 833, 848; 257/666; 438/335
See application file for complete search history.

(56) References Cited

U.S. PATENT DOCUMENTS 5,309,027 A *  5/1994  Letterman, Jr. ....... H01L 21/565
                                                      257/666
5,400,072 A *  3/1995  Izumi ...................... G02B 9/12
                                                      348/335

* cited by examiner

*Primary Examiner* — Donghai D Nguyen
(74) *Attorney, Agent, or Firm* — Joseph M. Butscher; The Small Patent Law Group, LLC

(57) ABSTRACT

A lead frame for insert molding in a plastic body is provided with an opening defining an edge suitable for detection by pattern recognition systems. During the insert molding process, a pin is positioned in the opening so that the opening remains void of plastic following the injection molding process.

13 Claims, 3 Drawing Sheets

METHODS OF MANUFACTURING A PATTERN RECOGNITION FEATURE ON A MOLDED LEAD FRAME

CROSS-REFERENCE TO RELATED APPLICATIONS

The present application is a division of U.S. application Ser. No. 13/599,250, filed Aug. 30, 2012, which, in turn, claims the benefits of U.S. Provisional Application Ser. No. 61/551,747 filed Oct. 26, 2011, both of which are hereby incorporated by reference in their entireties.

FIELD OF THE INVENTION

The present invention relates generally to plastic molding processes, and more particularly, to injection molding processes that incorporate insert molding a stamped lead frame or other metal conductor to which electrical connections subsequently are made using automated processes employing pattern recognition software for locating the electrical connection site.

BACKGROUND OF THE INVENTION

In the automotive electronics packaging industry, wire bonding is used as a means for making electrical connections between electronic components and a stamped lead frame that often is insert molded within an injection molded plastic housing. A wire is bonded with specialized equipment, known as a wire bonder, to the electronic component and to the stamped lead frame. The wire bonder uses a pattern recognizing vision system to identify features within the molded housing from which the location of the wire bonding sites is determined. The features to be recognized must have a certain level of consistency in order for the wire bonder to successfully identify the feature and its location. Software then calculates the expected location of the bonding site relative to the detected location of the feature, and the system automatically creates a bond at the calculated location. This process is commonly referred to as "pattern recognition".

Wire bonders work at relatively high rates of speed both when performing pattern recognition and when doing the actual wire bonding steps. Inconsistency in the visual quality of the pattern recognition features can lead to misplacing wire bonds, which thereafter can result in assembly-line stoppages. Accordingly, consistent and rapid pattern recognition is a desirable feature. Consistent pattern recognition requires consistency in manufacture from one part to the next so that the features to be recognized by the pattern recognition system do not vary significantly from one part to the next part.

In automotive sensors, a stamped lead frame often is secured in a plastic sensor housing, and wires are subsequently bonded to the lead frame. In an accepted process, the stamped lead frame is insert-molded into the plastic of the housing. During the molding process, the molten plastic typically molds up to the edge of the stamping. An outer edge of the stamping commonly is used as a pattern recognition feature. If, during the molding process, the plastic flows up to and over the top edge of the insert molded lead frame, the interface between plastic and the lead frame edge can be inconsistent or jagged. A jagged, inconsistent edge creates recognition difficulties for the pattern recognition system and can result in defective wire bonds.

It is desirable and advantageous to have a pattern recognition feature that is consistent from one part to another part so that recognition of the feature is easy and consistent. To produce a consistently clean edge for pattern recognition, it is desirable to prevent plastic from molding up to the edge intended to be used for pattern recognition.

SUMMARY OF THE INVENTION

To produce a consistently clean edge for pattern recognition, a feature in the mold is used to keep plastic away from the edge used for pattern recognition. Rather than keeping the plastic away from the outside edge of the stamping, it is preferable to establish an opening in the stamping inwardly from the outside edge. A pin from the mold can be placed into the hole to keep the molten plastic out of the hole during the molding process.

A stamped hole in a stamped lead frame is more accurate and consistent than an outside edge of the lead frame in terms of size and location, and therefore can produce a more consistently clean edge useful for pattern recognition. Having a pin in the hole effectively keeps the plastic at the bottom or backside of the stamped lead frame and ensures a consistently clean edge at the top surface with sufficient depth to be useful for pattern recognition. A consistent clean edge is well-suited to be used as a pattern recognition feature.

Other features and advantages of the invention will become apparent to those skilled in the art upon review of the following detailed description, claims and drawings in which like numerals are used to designate like features.

Figure 1:
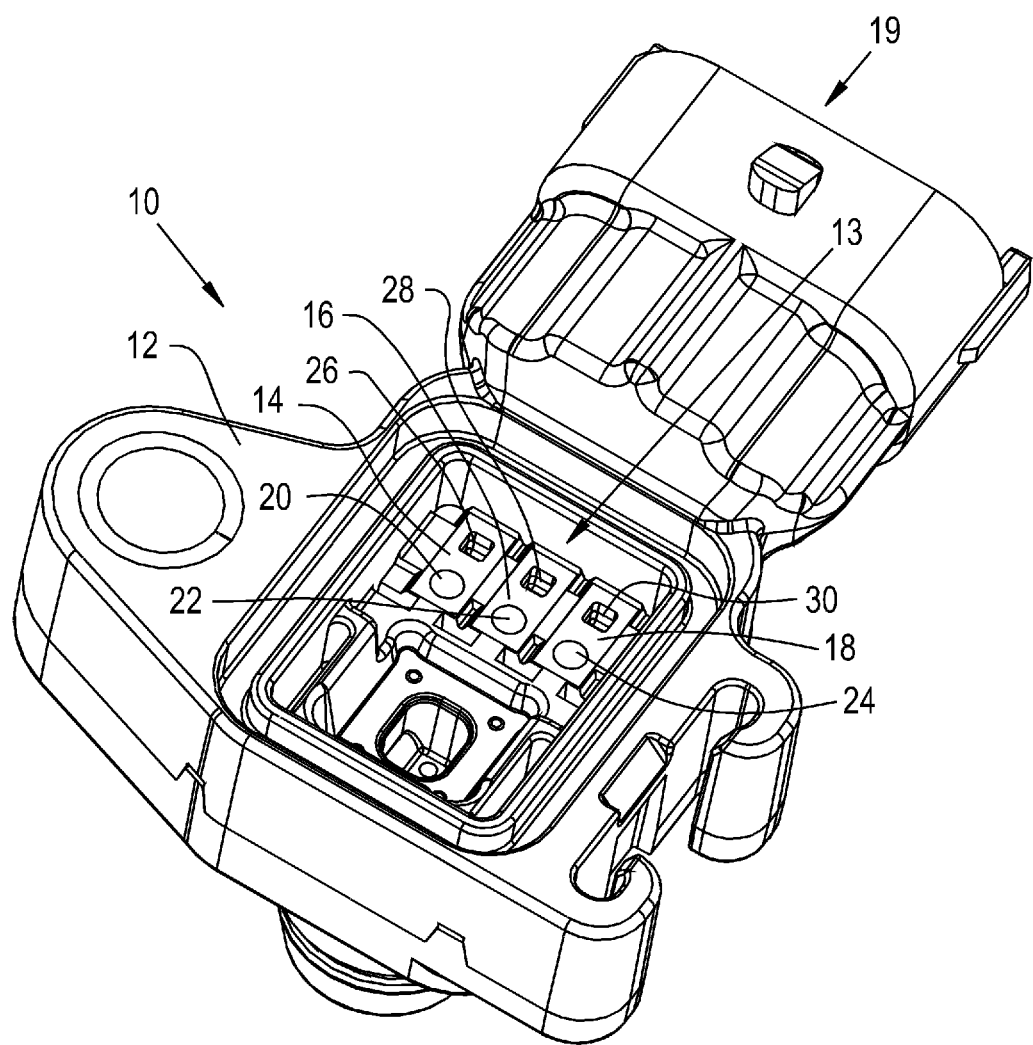
FIG. 1 is a perspective view of an insert molded electrical component having a lead frame with a stamped feature for pattern recognition.
Figure 2:
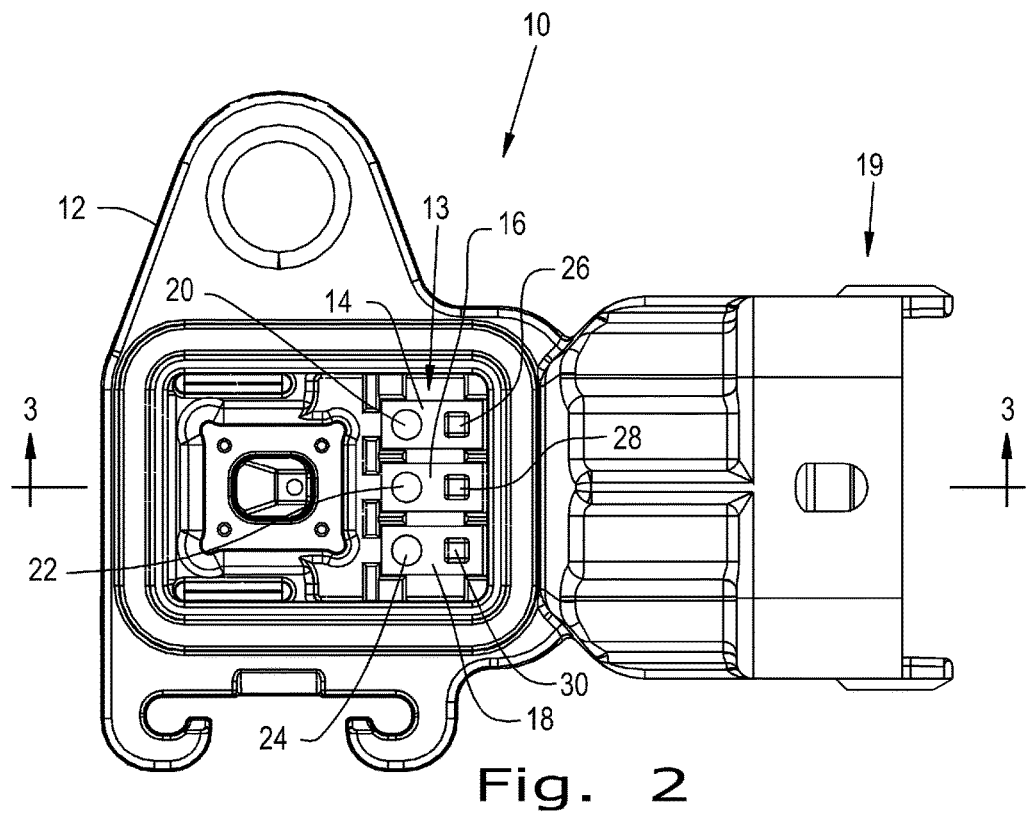
FIG. 2 is a top view of the electrical component shown in FIG. 1.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, an insert molded electrical component 10 is shown. Component 10 has a molded plastic body 12 with an insert molded lead frame 13 including electrically conductive bodies 14, 16, 18 configured for connecting by physical attachment to another component in a connector end 19 of component 10. Each of the conductive bodies 14, 16, 18 includes a wire bonding site, such as a bond pad 20, 22, 24, respectively, for wire bonding in a subsequent assembly operation. As known to those skilled in the art, wires or conductors of other types are electrically connected to bond pads 20, 22 & 24 to establish an electrical connection between electrically conductive bodies 14, 16, 18 and another part or component (not shown). An automated wire bonder is used to electrically connect wires or conductors to bond pads 20, 22, 24, the wire bonder including a pattern recognition system and software for determining where the electrically conductive bond should be created by recognizing a feature or features in component 10 and calculating the positions of the bond pads 20, 22, 24 relative to the recognized feature or features. Pattern recognition systems useful for such operations are commonly used in the industry and are well-known to those skilled in the art.

Figure 3:
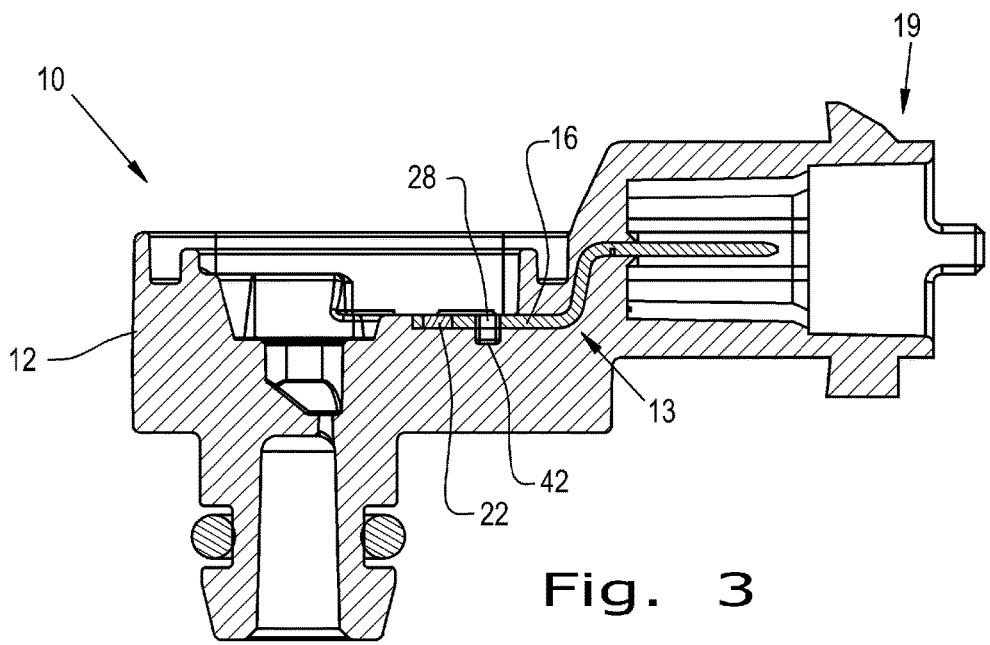
FIG. 3 is a cross-sectional view of the electrical component shown in FIGS. 1 & 2, the cross-section taken along line 3-3 of FIG. 2.
Figure 4:
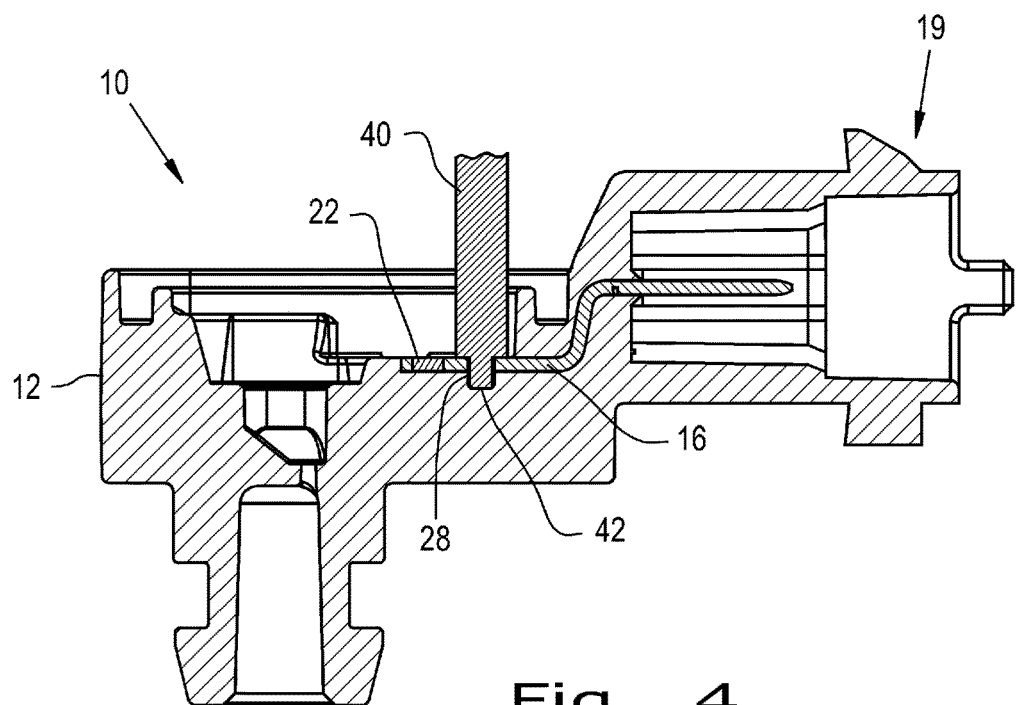
FIG. 4 is a cross-sectional view similar to that of FIG. 3, but illustrating the electrical component during an injection molding process.

Each of the conductive bodies 14, 16, 18 is provided with a dedicated pattern recognition feature in the nature of a hole, aperture or opening 26, 28, 30, respectively, the openings 26, 28, 30 defining internal edges in the conductive bodies that are inwardly of exterior edges of the conductive bodies. Conductive bodies 14, 16, 18 are commonly manufactured by a stamping process, and stamp machine tooling can be provided with a suitable punch for creating a precisely formed and precisely located opening 26, 28, 30 in an efficient process. In the subsequent injection molding process during which plastic body 12 is formed with conductive bodies 14, 16, 18 insert molded therein, pins from the mold steel fit into the openings 26, 28, 30 in a manner so as to substantially fill the openings and prevent injected molten plastic from entering into the openings. FIG. 4 illustrates lead frame 13 loaded in a mold after plastic for body 12 has been supplied. A mold pin 40 is fitted into opening 28 to prevent plastic from entering opening 28. Accordingly, plastic from molded plastic body 12 is retained at a low-level below the top edge of the stamping so that clean edges from the stamped holes 26, 28, 30 remain along the surface of lead frame 13 following the molding process, without flash or other obliteration or interruption from the molded plastic. Preferably, the entire depths of the openings 26, 28, 30 are kept free from injected plastic, and the mold pins inserted therethrough during the injection molding process can extend completely through the stamping and slightly beyond to create cavities or depressions below the openings 26, 28, 30. FIGS. 3 & 4 illustrate depression 42 beneath opening 28. Accordingly, the accurately defined, precise edges of dedicated pattern recognition openings 26, 28, 30 provide accurate and consistent edges and depths useful in the pattern recognition process for subsequent wire bonding at bond pads 20, 22, 24.

Providing a pattern recognition opening as an internal edge in the conductive body, with the internal edge relatively closely spaced from the bond pad of the conductive body provides accuracy advantages over the use of more distant features for the pattern recognition system. While a pattern recognition opening can be provided in a plastic body or other structures more distant from the bond pad, the more distant locations can be susceptible to errors in calculation if heat from the bonding process distorts the plastic body.

Figure 5:
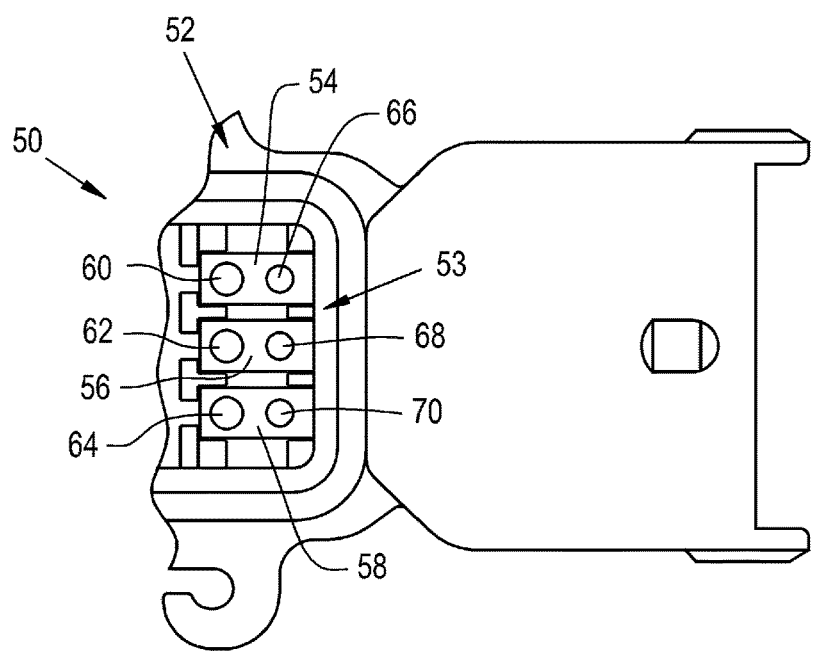
FIG. 5 is a fragmentary top view of modified form of the electrical component.

In the exemplary embodiment of FIGS. 1-4, openings 26, 28, 30 are square, and one such opening 26, 28, 30 is provided in each conductive body 14, 16, 18. However, it is believed that other shapes can be used. For example, a non-square rectangular opening can be used with pattern recognition software operating to identify straight edges. Still other shapes may be useful for some systems. For example, circular openings may have use with some pattern recognition systems scanning a larger visual field to detect a curved edge. FIG. 5 illustrates an electrical component 50 having an injection molded plastic body 52 with a lead frame 53 having electrically conductive bodies 54, 56, 58 insert molded in plastic body 52. Each of the electrically conductive bodies 54, 56, 58 has a bond pad 60, 62, 64 and a dedicated pattern recognition opening 66, 68, 70 respectively. Electrically conductive bodies 54, 56, 58 are similar to bodies 14, 16, 18 described previously except that pattern recognition openings 66, 68, 70 thereof are circular. Insert molding and subsequent assembly and use of component 50 can be undertaken similarly to the previous descriptions for component 10

While a single pattern recognition opening is shown in each of the conductive bodies 14, 16, 18 and 54, 56, 58; it should be understood that a series of pattern recognition openings may be provided in one or all of the bodies. Further, in an assembly such as that of the exemplary embodiments, it may not be necessary to provide a pattern recognition opening or openings in each of the conductive bodies 14, 16, 18 or 54, 56, 58. A pattern recognition opening or openings in one of the bodies, or such opening or openings in less than all of the bodies, such as for example, the outermost bodies, may be sufficient for the software to determine the locations of all bonding sites.

In the exemplary embodiments, the pattern recognition openings are provided through the thickness of the conductive bodies. Since the pattern recognition systems and software require a certain level of contrast to define the detectable feature, bodies of conductive metal, possibly coated with gold, palladium or the like, provide significant contrast in a plastic body that often is black. However, in some assemblies in which the plastic body is of a different color offering less contrast to the conductive bodies, if the assembly does not require an environmental seal, it may be advantageous to provide a through hole through the conductive body as well as the plastic body. For example, a mold pin or pins similar to pin 40 can extend to a confronting face of the mold steel to provide a through hole or holes in the plastic body, rather than a depression such as depression 42. The through hole in the plastic body is aligned with the dedicated pattern recognition opening. A back light behind the component directed so as to shine through the hole in the plastic body and the aligned dedicated pattern recognition opening can provide enhanced contrast for detection by the pattern recognition system and software.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A manufacturing process comprising steps of:
   stamping a lead frame in conductive material, including creating an opening through the lead frame inwardly from exterior edges of the lead frame;
   loading the lead frame into a mold;
   inserting a pin through the opening;
   molding a plastic body around the lead frame without filling the opening with plastic to retain an exposed edge of the opening as a feature detectable by a pattern recognition system; and
   detecting the exposed edge of the opening to determine a site on the lead frame for creating an electrical connection between the site and a component by wire bonding.

2. The manufacturing process of claim 1, including creating a plurality of the openings through the lead frame; and said step of inserting a pin including inserting a different pin through each of the openings.

3. The manufacturing process of claim 1, including creating a rectangular opening.

4. The manufacturing process of claim 1, including forming a depression in the plastic body aligned with the opening through the lead frame.

5. The manufacturing process of claim 4, including maintaining the opening void of plastic throughout the thickness of the lead frame.

6. The manufacturing process of claim 1, including maintaining the opening void of plastic throughout the thickness of the lead frame.

7. A manufacturing process comprising steps of:
   stamping a lead frame in conductive material, including creating a plurality of rectangular openings through the lead frame inwardly from exterior edges of the lead frame;
   loading the lead frame into a mold;
   inserting a different pin through each of the plurality of rectangular openings;
   molding a plastic body around the lead frame without filling the plurality of rectangular openings with plastic to retain exposed edges of the plurality of rectangular openings as features detectable by a pattern recognition system;
   forming at least one depression in the plastic body aligned with at least one the plurality of openings through the lead frame;
   maintaining the plurality of openings void of plastic throughout the thickness of the lead frame; and
   detecting the exposed edges of the plurality of rectangular openings to determine sites on the lead frame for creating electrical connections between the sites and a component by wire bonding.

8. A manufacturing process comprising steps of:
   creating an opening through a lead frame inwardly from exterior edges of the lead frame;
   inserting a pin through the opening;
   molding a plastic body around the lead frame without filling the opening with plastic;
   forming an exposed edge of the opening through the molding; and
   detecting the exposed edge of the opening to determine a site on the lead frame for creating an electrical connection between the site and a component by wire bonding.

9. The manufacturing process of claim 8, including creating a plurality of the openings through the lead frame; and said step of inserting a pin including inserting a different pin through each of the openings.

10. The manufacturing process of claim 8, including creating a rectangular opening.

11. The manufacturing process of claim 8, including forming a depression in the plastic body aligned with the opening through the lead frame.

12. The manufacturing process of claim 11, including maintaining the opening void of plastic throughout the thickness of the lead frame.

13. The manufacturing process of claim 8, including maintaining the opening void of plastic throughout the thickness of the lead frame.

* * * * *